(12) United States Patent
Mirrokni Banadaki et al.

(10) Patent No.: US 11,238,357 B2
(45) Date of Patent: Feb. 1, 2022

(54) GENERATING COMPUTATIONALLY-EFFICIENT REPRESENTATIONS OF LARGE DATASETS

(71) Applicant: Google LLC, Mountain View, CA (US)

(72) Inventors: Seyed Vahab Mirrokni Banadaki, Hoboken, NJ (US); Hossein Esfandiari, Adelphi, MD (US); MohammadHossein Bateni, South Orange, NJ (US)

(73) Assignee: Google LLC, Mountain View, CA (US)

( * ) Notice: Subject to any disclaimer, the term of this patent is extended or adjusted under 35 U.S.C. 154(b) by 807 days.

(21) Appl. No.: 16/042,975

(22) Filed: Jul. 23, 2018

(65) Prior Publication Data

US 2019/0026640 A1 Jan. 24, 2019

Related U.S. Application Data

(60) Provisional application No. 62/535,795, filed on Jul. 21, 2017.

(51) Int. Cl.
*G06F 7/00* (2006.01)
*G06F 16/34* (2019.01)
(Continued)

(52) U.S. Cl.
CPC ............... *G06N 7/00* (2013.01); *G06F 8/31* (2013.01); *G06F 9/448* (2018.02); *G06F 17/10* (2013.01);
(Continued)

(58) Field of Classification Search
CPC .......... G06N 7/00; G06N 5/022; G06N 5/003; G06N 20/00; G06F 8/31; G06F 17/10; G06F 9/448; H04L 9/3239; H04L 9/0643
(Continued)

(56) References Cited

U.S. PATENT DOCUMENTS 8,028,337 B1 * 9/2011 Xu .................. H04L 63/00
726/23
8,095,530 B1 * 1/2012 Lloyd .................. G06F 7/02
707/709
(Continued)

OTHER PUBLICATIONS

'github.com' [online] "English Word List, Infochimps, Inc." 2016 [retrieved Nov. 9, 2018] Retrieved from Internet: URL< https://github.com/dwyl/english-words/blob/master/words.txt> 1 page.
(Continued)

*Primary Examiner* — Brandon S Cole
(74) *Attorney, Agent, or Firm* — Fish & Richardson P.C.

(57) ABSTRACT

Methods, systems, and apparatus, including computer programs encoded on computer storage media, for processing large datasets using a computationally-efficient representation are disclosed. A request to apply a coverage algorithm to a large input dataset is received. The large dataset includes sets of elements. A computationally-efficient representation of the large dataset is generated by generating a reduced set of elements that contains fewer elements based on a defined probability. For each element in the reduced set, a determination is made regarding whether the element appears in more than a threshold number of sets. When the element appears in more than the threshold number, the element is removed from sets until the element appears in only the threshold number. The coverage algorithm is then applied to the computationally-efficient representation to identify a subset of the sets. The system provides data identifying the subset of the sets in response to the received request.

20 Claims, 8 Drawing Sheets

(51) Int. Cl.
G06F 16/23 (2019.01)
G06F 16/24 (2019.01)
G06N 7/00 (2006.01)
H04L 9/06 (2006.01)
G06F 17/10 (2006.01)
G06F 9/448 (2018.01)
G06N 20/00 (2019.01)
G06F 8/30 (2018.01)
H04L 9/32 (2006.01)
G06N 5/02 (2006.01)
G06N 5/00 (2006.01)

(52) U.S. Cl.
CPC ............ *G06N 5/003* (2013.01); *G06N 5/022* (2013.01); *G06N 20/00* (2019.01); *H04L 9/0643* (2013.01); *H04L 9/3239* (2013.01)

(58) Field of Classification Search
USPC ...................................................... 706/1–62
See application file for complete search history.

(56) References Cited

U.S. PATENT DOCUMENTS

| | | | | |
|---|---|---|---|---|
| 10,678,778 | B1* | 6/2020 | Chalmer | G06F 16/2365 |
| 2002/0042681 | A1* | 4/2002 | Califano | G16B 25/10 702/20 |
| 2003/0126122 | A1* | 7/2003 | Bosley | G06F 16/1834 |
| 2007/0203924 | A1* | 8/2007 | Guha | G06F 16/34 |
| 2008/0032713 | A1* | 2/2008 | Yang | H04W 68/04 455/458 |
| 2008/0306945 | A1* | 12/2008 | Chaudhuri | G06F 16/2458 |
| 2010/0240046 | A1* | 9/2010 | Palmer | G16B 25/20 435/6.1 |
| 2010/0261481 | A1* | 10/2010 | Resende | H04W 36/385 455/446 |
| 2019/0026640 | A1* | 1/2019 | Mirrokni Banadaki | H04L 9/0643 |

OTHER PUBLICATIONS

'pypi.python.org' [online] "Python package Gutenberg" Clemens Wolff, version 0.4.2, May 18, 2018, [retrieved on Nov. 12, 2018] retrieved from Internet URL<https://pypi.python.org/pypi/Gutenberg> 8 pages.
'www.gutenberg.org' [online] "Search Project Gutenberg," 2016, Available on or before Jun. 2, 2007, [retrieved on Nov. 9, 2018] Retrieved from Internet: https://www.gutenberg.org/ebooks/> 1 page.
Ahn et al. "Graph Sparsification in the semi-streaming model," International Colloquium on Automata, Language and Programming, (2) Jul. 2009, arXiv 0902.0140, 10 pages.
Ahn et al. "Laminar families and metric embeddings: Non-bipartite maximum matching problem in the semi-streaming model," arXiv 1104.4058, Apr. 20, 2011, 27 pages.
Ahn et al. "Spectral sparsification in dynamic graph streams," Approximation, Randomization, and Combinatorial Optimization. Algorithms and Techniques, Springer 2013, 10 pages.
Altschuler et al. "Greedy column subset selection: New bounds and distributed algorithms," Proceedings of the 33$^{rd}$ International Confernece on Machine Learning, 2016, arXiv 1605.08795, Jun. 11, 2016, 14 pages.
Andoni et al. "Towards (1+E)-approximate flow sparsifiers," arXiv 1310.3252, Oct. 11, 2013, 27 pages.
Assadi et al. "Tight bounds for single-pass streaming complexity of the set cover problem", Proceedings of the forty-eights annual ACM symposium on Theory of Computing, Jun. 2016, 14 pages.
Assadi eta l. "Maximum matching in dynamic graph streams and the simultaneous communication model," Proceedings of the twenty-seventh annual ACM-SIAM Symposium on Discrete Algorithms, Society for Industrial and Applied Mathematics, Jan. 2016, 20 pages.

Backstrom et al. "Group formation in large social networks: Membership, growth and evolution," Proceedings of the 12$^{th}$ ACM SIGKDD International Conference on Knowledge Discovery and Data Mining, Aug. 2006, 11 pages.
Badanidiyuru et al. "Fast algorithms for maximizing submodular functions," Proceedings of the twenty-fifth annual ACM-SIAM Symposium on Discrete Algorithms, Society for Industrial and Applied Mathematics, Jan. 2014, 18 pages.
Badanidiyuru et al. "Sketching valuation functions," Proceedings of the twenty-third annual ACM-SIAM Symposium on Discrete Algorithms, Society for Industrial and Applied Mathematics, Jan. 2012, 11 pages.
Badanidiyuru et al. "Streaming submodular maximization: Massive data summarization on the fly," Proceedings of the 20$^{th}$ ACM SIGKDD International Conference on Knowledge Discovery and Data Mining, Aug. 2014, 10 pages.
Barbosa et al. "A new framework for distributed submodular maximization," arXiv 1507.03719, Jul. 14, 2015, 30 pages.
Barbosa et al. "The power of randomization: Distributed submodular maximization on massive datasets", International Conference on Machine Learning, Jun. 2015, 9 pages.
Bateni et al. "Distributed Balanced Clustering via Mapping Corsets," NIPS Dec. 2014, 9 pages.
Bateni eta l. "Distributed coverage maximization via sketching," arXiv 1612.02327v2, Mar. 10, 2017, 18 pages.
Bird et al. "NLTK: The Natural Language Toolkit," Proceedings of the ACL 2004 on Interactive poster and demonstration sessions. Association for Computational Linguistics, Jul. 2004, 4 pages.
Blelloch et al. Parallel and I/O efficient set covering algorithms, Proceedings of the twenty-fourth annual ACM Symposium on Parallelism in Algorithms and Architectures, Jun. 2012, 9 pages.
Borodin et al. "Max-sum diversification, monotone submodular functions and dynamic updates," Proceedings of the 31$^{st}$ ACM SIGMOD_SIGACT_SIGAI Symposium on Principles of Database Systems, May 2012, arXiv 1203.6397v3, Nov. 25, 2016, 17 pages.
Chakrabarti et al. "Incidence geometries and the pass complexity of semi-streaming set cover," Proceedings of the 27$^{th}$ annual ACM_SIAM Symposium on Discrete Algorithms, 2016, arXiv1507.04645v1, Jul. 16, 2015, 21 pages.
Chang et al. "Bigtable: A distributed storage system for structured data," OSDI, Seventh Symposium on Operating System Design and Implementation, Apr. 2006, 14 pages.
Chierichetti et al. "Max-Cover in Map-Reduce," Proceedings of the 19$^{th}$ International Conference on the World Wide Web, Apr. 2010, 10 pages.
Chitnis et al. "Kernelization via sampling with applications to finding matchings and related problems in dynamic graph streams," Proceedings of the twenty-seventh annual ACM_SIAM symposium on Discrete algorithms, Society for Industrial and Applied Mathematics, Jan. 2016, 19 pages.
Cormode et al. "Comparing data streams using hamming norms (how to zero in)," IEEE Transactions on Knowledge and Data Engineering 15(3), May 2003, 12 pages.
Cormode et al. "Set cover algorithms for very large datasets," Proceedings of the 19$^{th}$ ACM International Conference on Information Knowledge management, Oct. 2010, 10 pages.
Dean et al. "MapReduce: Simplified data processing on large clusters," To appear in OSDI, 2004, 13 pages.
Demaine et al. "On streaming and communication complexity of the set cover problem," International Symposium on Distributed Computing, Oct. 2014, 16 pages.
Emek et al "Semi-streaming set cover," arXiv 1404.6763v2, May 8, 2014, 24 pages.
Epstein et al. "Improved approximation guarantees for weighted matching in the semi-streaming model," arXiv 0907.0305, Jul. 2, 2009, 12 pages.
Esfandiari et al. "Streaming algorithms for estimating the matching size in planar graphs and beyond," ACM-SIAM Jan. 2015, 28 pages.
Feige. "A threshold on in n for approximating set cover," Journal of the ACM 45(4), Jul. 1998, 19 pages.
Feigenbaum et al. "On graph problems in a semi-streaming model," Theor. Comput. Sci, 348(2), Dec. 2005, 10 pages.

(56) References Cited

OTHER PUBLICATIONS

Guron et al. "An introduction to variable and feature selection," Journal of Machine Learning Research, Mar. 2003, 26 pages.
Har-Peled et al. Towards tight bounds for the streaming set cover problem, PODS, 2016, arXiv 1509.00118v2, May 2, 2016, 25 pages.
Hassidim et al. "Submodular optimization under noise," arXiv 1601.03095v3, Nov. 4, 2016, 83 pages.
Indyk et al. "Composable core-sets for diversity and coverage maximization", Proceedings of the 33$^{rd}$ ACM SIGMOD-SIGACT-SIGART Symposium on the Principles of Database systems, ACM, Jun. 2014, 9 pages.
Joag-Dec et al. "Negative association of random variables with applications," The Annals of Statistics, Mar. 1983, 10 pages.
Kapralov et al. "Approximation matching size from random streams," Proceedings of the twenty-fifth annual ACM-SIAM Symposium on Discrete Algorithms, Society for Industrial and Applied Mathematics, Jan. 2014, 18 pages.
Kapralov eta l. "Streaming lower bounds for approximating Max-Cut," Proceedings of the Twenty-sixth annual ACM-SIAM symposium on Discrete Algorithms, Society for Industrial and Applied Mathematics, Jan. 2015, arXiv 1409.2138, 29 pages.
Karloff et al. "A model of computation for MapReduce," Proceedings of the Twenty-first annual ACM-SIAM symposium on Discrete Algorithms, Society for Industrial and Applied Mathematics, Jan. 2010, 11 pages.
Konrad et al. "Approximating semi-matching in streaming in two-party communication," ACM Transactions on Algorithms, 12(3), Jun. 2016, arXiv 1304.3906, 16 pages.
Kumar et al. "Fast greedy algorithms in MapReduce and streaming," SPAA, Jun. 2013, 10 pages.
Leskovec et al. "Governance of social media: A case study of the Wikipedia promotion process," AAAI, Apr. 2010, 8 pages.
Lewis et al. "RCV1: A new benchmark collection for text categorization research," Journal of Machine Learning Research, Apr. 2004, 37 pages.
McGregor et al. "Better streaming algorithms for the maximum coverage problem," arXiv 1610.06199v6, May 9, 2018, 19 pages.
Mirrokni et al. "Randomized composable core-sets for distributed submodular maximization," Proceedings of the forty-seventh annual ACM Symposium on Theory of Computing, ACM, Jun. 2015, 10 pages.
Mirzasoleiman et al. "Distributed submodular cover: Succinctly summarizing massive data," Advances in Neural Information Processing Systems, Dec. 2015, 9 pages.
Mirzasoleiman et al. "Distributed submodular maximization. Identifying representative elements in massive data," Advances in Neural Information Processing Systems, Dec. 2013, 9 pages.
Mirzasoleiman et al. "Fast distributed submodular cover: Public-private data summarization," Advances in Neural Information Processing Systems, Dec. 2016, 9 pages.
Mirzasoleiman et al. "Lazier than lazy greedy," arXiv 1409.7938v3, Nov. 28, 2014, 7 pages.
Nemhauser et al. "An analysis of approximations for maximizing submodular set functions aATi," Mathematical Programming, 14(1), Dec. 1978, 15 pages.
Panconesi et al. "Randomized distributed edge coloring via an extension of the Chernoff-Hoeffding bounds," SIAM Journal on Computing 26(2), Apr. 1997, 19 pages.
Saha et al. "On maximum coverage in the streaming model & application to multi-topic blog-watch," Proceedings of the 2009 SIAM International Conference on Data Mining, Society for Industrial and Applied Mathematics, Apr. 2009, 12 pages.

* cited by examiner

["I read", "read a", "a book", "book about", "about the", "the history", "history of", "of baseball", "The sky", "sky is", "is clear", "clear and", "and the", "the stars", "stars are", "are twinkling", "Should I", "of computing", "are out", "the moon", "moon is", "is shining"]

["I read", "read a", "a book", "book about", "about the", ["the history"], "history of", "of baseball"]

["The sky", "sky is", ["is clear"], ["clear and"], "and the", "the stars", "stars are", "are twinkling"]

["Should I", "I read", "read a", "a book", "book about", "about the", ["the history"], "history of", "of computing"]

["I read", "read that", "the stars", "stars are", "are out", "and the", "the moon", "moon was", "is shining"]

FIG. 3B

Algorithm 1 $H_{G,S}(k, \epsilon, \delta'')$

Input: An input graph $G$, $k$, $\epsilon \in (0, 1)$, and $\delta''$.
Output: Sketch $H_{G,S}(k, \epsilon, \delta'')$.
1: Set $\delta = \delta'' \log \log_{\frac{1}{1-\epsilon}} m$.
2: Let $h$ be an arbitrary hash function that uniformly and independently maps $\mathcal{E}$ in $G$ to $[0, 1]$.
3: Initialize $H_{G,S}(k, \epsilon, \delta'')$ with vertices $S$ of $G$, and no edge.
4: while number of edges in $H_{G,S}(k, \epsilon, \delta'')$ is less than $\frac{24ck \log(1/\epsilon) \log n}{(1-\epsilon)^2}$ do
5:   Pick $v \in \mathcal{E}$ of minimum $h(v)$ that is still not in $H_{G,S}(k, \epsilon, \delta'')$.
6:   if degree of $v$ in $G$ is less than $\frac{s \log(1/\epsilon)}{k}$ then
7:     Add $v$ along with all its edges to $H_{G,S}(k, \epsilon, \delta'')$.
8:   else
9:     Add $v$ along with $\frac{s \log(1/\epsilon)}{k}$ of its edges, chosen arbitrary, to $H_{G,S}(k, \epsilon, \delta'')$.

FIG. 4A

Algorithm 2 Streaming algorithm to compute $H_{G,S}(k, \epsilon, \delta'')$

Input: An input graph $G$, $k$, $\epsilon \in (0, 1)$, and $\delta''$.
Output: Sketch $H_{G,S}(k, \epsilon, \delta'')$.
Initialization:
1: Set $\delta = \delta'' \log \log_{\frac{1}{1-\epsilon}} m$.
2: Pick $\frac{24ck \log(1/\epsilon) \log n}{(1-\epsilon)^2} + \frac{s \log(1/\epsilon)}{k}$ elements from $\mathcal{E}$ uniformly at random and let $\Pi$ be a random permutation over these elements.
3: Initialize $H_{G,S}(k, \epsilon, \delta'')$ with vertices $S$ of $G$, and no edge.
Update edge $(u, v)$:
1: if $v$ is not sampled in $\Pi$ then
2:   Discard $(u, v)$.
3: else if degree of $v$ in $G$ is $\frac{s \log(1/\epsilon)}{k}$ then
4:   Discard $(u, v)$.
5: else
6:   Add $(u, v)$ to $H_{G,S}(k, \epsilon, \delta'')$.
7: while number of edges in $H_{G,S}(k, \epsilon, \delta'')$ is more than $\frac{24ck \log(1/\epsilon) \log n}{(1-\epsilon)^2} + \frac{s \log(1/\epsilon)}{k}$ do
8:   Let $w$ be the last element in $\Pi$.
9:   Remove $w$ from $\Pi$.
10:  Remove $w$ from $H_{G,S}(k, \epsilon, \delta'')$.

FIG. 4B

| | |
|---|---|
| 344 | Input: Input graph $G$ and parameters $k, \varepsilon \in (0,1], \delta^p$. |
| 345 | Output: Solution to the coverage problem. |
| 346 | Let $h : \mathcal{E} \mapsto [0,1]$ be a uniform, independent hash function. |
| 347 | |
| 348 | Round 1: Send the edges of each element to a distinct |
| 349 | machine. Let $\tilde{n} = \frac{24nd \log(1/\varepsilon) \log n}{(1-\varepsilon)\delta^2}$. For each ele- |
| 350 | ment $v$, if $h(v) \leq \frac{2\tilde{n}}{n}$, the machine corresponding to |
| 351 | $v$ sends $h(v)$ and its degree to machine one; it does |
| 352 | nothing otherwise. |
| 353 | Round 2: Machine one iteratively selects elements with |
| 354 | the smallest $h$ until the sum of the degrees of the |
| 355 | selected vertices reaches $\tilde{n}$. Then it informs the ma- |
| 356 | chines corresponding to selected elements. |
| 357 | Round 3: For each selected element $v$, if the degree of |
| 358 | $v$ is less than $\Delta = \frac{n \log(1/\varepsilon)}{\varepsilon k}$, machine $v$ sends all its |
| 359 | edges to machine one. Otherwise, it sends $\Delta$ arbi- |
| 360 | trary edges to machine one. |
| 361 | Round 4: Machine one receives the sketch $H_{\leq \tilde{n}}$ and |
| 362 | solves the coverage problem on it by applying a |
| 363 | greedy algorithm. |

GENERATING COMPUTATIONALLY-EFFICIENT REPRESENTATIONS OF LARGE DATASETS

CROSS-REFERENCE TO RELATED APPLICATION

This application claims priority to U.S. Provisional Application No. 62/535,795, filed on Jul. 21, 2017. The disclosure of the prior application is considered part of and is incorporated by reference in the disclosure of this application.

BACKGROUND

This specification relates to processing of distributed large datasets using coverage optimization problems.

Machine learning models receive input and generate output based on the received input and on values of model parameters. These models need to be trained using received inputs which are very large datasets. Typically, models have hundreds to hundreds of millions of inputs. The large datasets may include hundreds of millions of sets and tens of trillions of elements.

To process large amounts of distributed data and effectively train models, systems often need to identify representative data and important features on which to train the models. Coverage optimization problems can help systems efficiently identify the appropriate training data.

SUMMARY

This specification describes methods and systems, including computer programs encoded on computer storage media, for processing large distributed datasets using coverage optimization problems. These methods and systems generally involve generating a reduced representation of a large distributed dataset and solving coverage problems using the reduced representation.

In general, one innovative aspect of the subject matter described in this specification can be embodied in methods that include the actions of generating a computationally-efficient representation of a large dataset and solving a coverage problem using the reduced representation. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

The system can receive a request to apply a coverage algorithm to a large input dataset comprising a plurality of sets of elements, each set including one or more elements from a ground set of elements. A computationally-efficient representation of the large dataset is then generated. To generate the computationally-efficient representation, the system first generates a reduced set of elements that contains fewer elements than the ground set of elements by removing elements from the ground set of elements based on a defined probability. Then, for each element in the reduced set of elements, the system determines whether the element appears in more than a threshold number of the plurality of sets. When the element appears in more than the threshold number of sets, the system removes the element from sets in the plurality of sets until the element appears in only the threshold number of the plurality of sets. The system then applies the coverage algorithm to the computationally-efficient representation of the larger input dataset to identify a subset of the plurality of sets. The system then provides data identifying the subset of the sets in response to the received request.

The system generates the reduced set of elements using a hashing function to determine a respective hash value for each element in the ground set of elements and removes each element from the ground set of elements whose hash value exceeds the defined probability.

When generating the reduced set of elements, the system may assign each element to a respective machine. For each element, the machine to which the element has been assigned determines a hash value of the element. If the hash value is less than the defined probability, the machine sends the hash value for the element and a degree of the element to a designated single machine. The degree of the element is a number of sets to which the element belongs. The single machine receives the hash values and the degrees of the elements that have hash values less than the defined probability. The machine iteratively selects elements for inclusion in the reduced set by increasing the hash value until a total degree of selected elements in the reduced set reaches a second predefined amount. The computationally-efficient representation is generated by, for each element in the reduced set, determining, by the machine to which the element has been assigned, whether the degree of the element exceeds the threshold number, when the degree does not exceed the threshold number, the data identifying the sets to which the element belongs is sent to a single machine. When the degree exceeds the threshold number, the data identifying the threshold number of sets to which the element belongs is sent to the single machine. The single machine receives the number of selected elements from the respective machines and generates the computationally-efficient representation of the plurality of sets from the received elements.

In some implementations, the total size of the computationally-efficient representation of the plurality of sets of elements fits on memory of one machine.

In some implementations, the coverage algorithm is a k-cover algorithm. In other implementations, the coverage algorithm is a set-cover algorithm. In still other implementations, the coverage algorithm is a set-cover with outliers algorithm. The coverage algorithm may additionally or alternatively be a set-cover in iterations algorithm.

Applying the coverage algorithm to the computationally-efficient representation of the large input dataset may include applying the coverage algorithm to the computationally-efficient representation of the large input in a large-scale computational framework. The large-scale computational framework may be a MapReduce model, a RAM model, or a streaming model.

Generating the computationally-efficient representation of the large input dataset may include generating a representation that optimizes a running time of the coverage algorithm.

Generating the computationally-efficient representation of the large-input dataset may include generating a representation that optimizes space usage.

Generating the computationally-efficient representation of the large-input dataset may include generating a representation that optimizes an approximation guarantee of the coverage algorithm.

Generating the computationally-efficient representation of the large-input dataset may include generating a representation that optimizes the number of rounds or passes required to identify the subset.

The probability may be based on a total number of sets.

The threshold may be based on a total number of sets.

The subject matter described in this specification can be implemented in particular embodiments so as to realize one or more of the following advantages.

An example optimization system creates a computationally-efficient representation of a large distributed data set that includes multiple sets of elements, i.e., a data set that includes a large number of sets, sets that include a large number of elements, or both, for coverage problems. The system creates the computationally-efficient representation by efficiently summarizing the dataset, focusing on sets which suffice to solve the coverage problem for the entire dataset. The computationally-efficient representation can be used in place of the total sets when solving a coverage problem. By using the computationally-efficient representation when solving a coverage problem, a system can run the coverage problem quickly and efficiently without using an excessive amount of memory. In other words, by making use of the generated computationally-efficient representation, the system can solve coverage problems with a high degree of accuracy while using less memory than conventional approaches.

The optimization system also provides algorithms that optimally solve coverage problems, i.e., in terms of running time, space usage, approximation guarantee, or the number of passes or rounds required to produce a solution.

Several measurements can be compared to determine the usefulness of different algorithms in terms of memory, data access, and produced solutions.

For maximum-k cover, the system provides an algorithm that works with a streaming data model. The algorithm is flexible and can receive data in any order.

The system provides a one-pass, streaming algorithm with 1−1/e-epsilon approximation guarantee that consumes quasilinear space in the number of sets. The algorithm reads the data only once and has an approximation factor 1−1/e-epsilon for small values of epsilon which is close to 0.63. In other words, the solution found by the algorithm covers at least 63% of the optimum in the worst case. In practice, the algorithm covers more than 90%. The algorithm provides the best possible provable guarantee. The algorithm also only uses quasilinear space in terms of the number of sets in the input. The amount of memory necessary for the algorithm is only a few bytes per set in the input. The number of sets is usually much smaller than the number of inputs. It is mathematically impossible to find an algorithm with smaller memory consumption that always provides a good approximation ratio.

The system additionally provides a p-pass, streaming algorithm for set cover with approximation guarantee (1+eps)log m that uses almost linear space where p is logarithmic. In other words, the algorithm is the best possible in terms of running time, memory consumption, and approximation factor.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A illustrates the hash values corresponding to the ground set of FIG. 2B.

FIG. 3B illustrates the elements to be removed from the sets based on probability.

FIG. 4A illustrates an algorithm for constructing a computationally-efficient representation for RAM models.

FIG. 4B illustrates an algorithm for constructing a computationally-efficient representation for streaming models.

FIG. 4C illustrates an algorithm for constructing a computationally-efficient representation for distributed models.

FIG. 4D illustrates an algorithm for solving a k-cover problem using the computationally-efficient representation for streaming models.

FIG. 4E illustrates an algorithm for solving set cover problem using the computationally-efficient representation for streaming models.

FIG. 4F illustrates an algorithm for solving set cover with outliers using the computationally-efficient representation for streaming models.

FIG. 4G illustrates an algorithm for solving set cover problems in r iterations using the computationally-efficient representation for streaming models.

Like reference numbers and designations in the various drawings indicate like elements.

DETAILED DESCRIPTION

Figure 1:
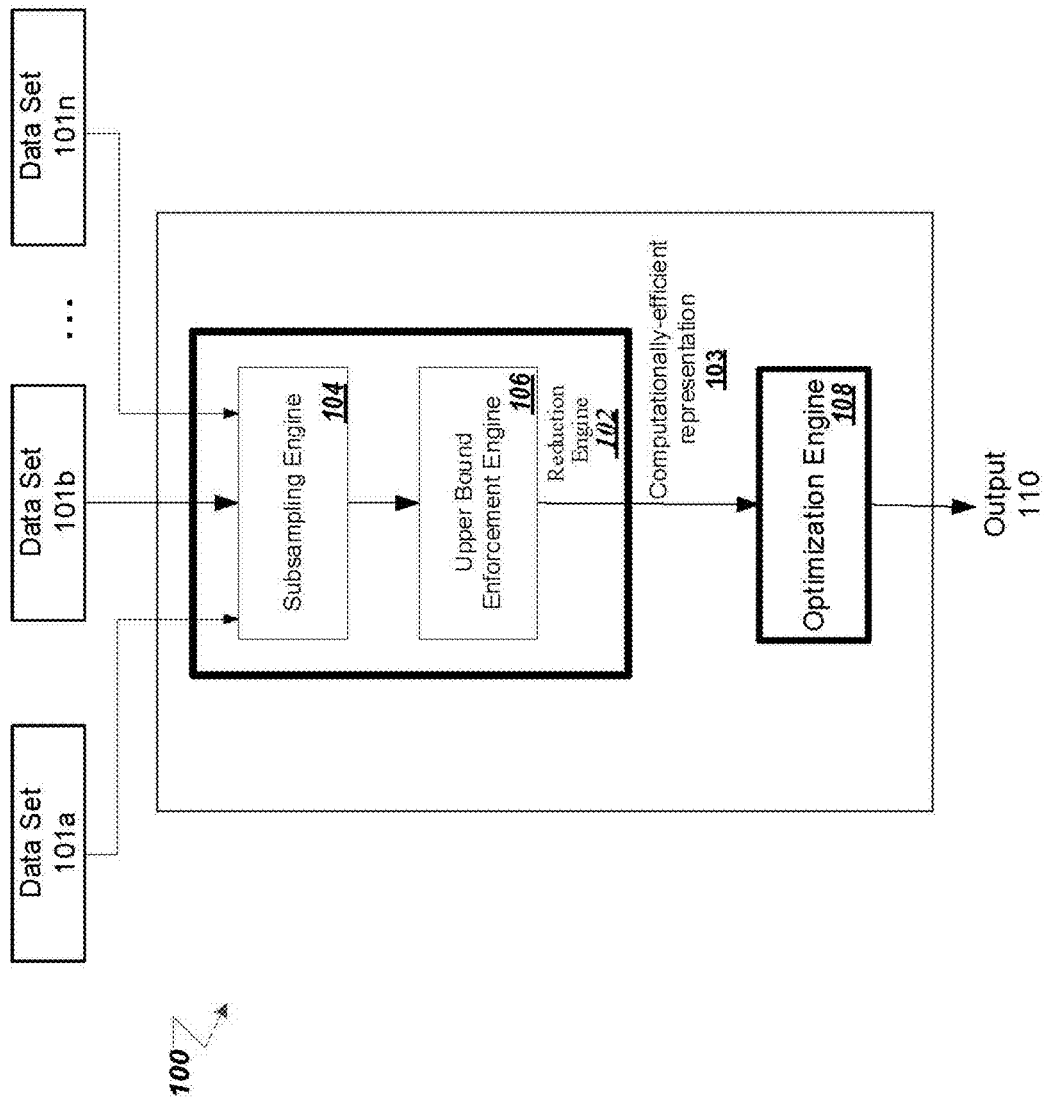
FIG. 1 illustrates an example optimization system.

Coverage problems are classical problems in computer science, computational complexity theory, and operations research. Two types of coverage problems are maximum k-cover and minimum set cover problems.

A maximum k-cover problem takes as input several sets of elements and a number k and provides a solution that selects at most k sets that cover the maximum number of elements. In other words, the solution is a union of the selected sets that has a maximal size. This maximum k-cover problem is very good at identifying representative features in large datasets that can be used to train a machine learning model.

A minimum set cover problem takes as input several sets of elements and provides a solution that selects the smallest number of sets required to cover all elements. The minimum set cover problem is helpful at finding difficult examples within a large dataset for machine learning model training.

Coverage problems may be modeled as bipartite graphs where some vertices represent sets and other vertices represent elements. Vertices that represent sets are connected by edges to elements that are contained within the sets. Thus, each edge represents the relationship between a set and an element of the set.

Large datasets can be processed using one of several different models. For example, the large data may be accessible for processing using a distributed computation model, e.g., MapReduce. The model assumes that the data is split across multiple machines. In each round of distributed processing, the data is processed in parallel on all machines. Each machine waits to receive messages sent to it in the previous round, performs its own computation, and finally sends messages to other machines. Two important factors determine the performance of the distributed processing: (i) the number of rounds of computation and (ii) the maximum load on any machine where load is the total amount of data processed by a given machine.

In a streaming model, edges arrive one by one and a processing system understands the set-element relationship one at a time. The number of passes allowed for processing data is crucial and may change the nature of the problem. The system has limited space which may not be enough to store the whole input.

Another model for processing a large amount of data is the RAM model. Data processing executions have a random access to any part of the data, but each lookup to find data takes constant time.

In order to optimize processing of large datasets to solve coverage problems, e.g., to identify training data for machine learning models, the optimization system of this specification efficiently summarizes received data into a computationally-efficient representation, e.g., a smaller problem instance, to focus only on the data which suffices for solving a specified optimization problem. The general approach to generate a computationally-efficient representation is to process a large dataset in two stages: (1) a first stage subsamples elements in the dataset and (2) a second stage to remove elements that occur more than an upper bound number of times in the dataset.

FIG. 1 shows an example optimization system 100 that generates a computationally-efficient representation 103 for coverage problems and uses the representation 103 to execute optimal algorithms and provide coverage problem solutions. The system 100 can be implemented as computer programs on one or more computers in one or more locations, in which the systems, components, and techniques described below can be implemented.

As illustrated, the optimization system 100 receives a large dataset 101a-n and provides coverage problem solutions as outputs 110. The system determines the solutions using a computationally-efficient representation 103 of the large dataset. In some implementations, the large dataset is distributed across multiple machines as illustrated in FIG. 1.

The system includes data as input 101a-n, a reduction engine 102 for creating a computationally-efficient representation of the input, an optimization engine 108 for solving optimization problems using the computationally-efficient representation, and solutions to the optimization problems as output 110. The reduction engine 102 includes a subsampling engine 104 and an upper bound enforcement engine 106.

In some implementations, in addition to the dataset, the system also receives data specifying the coverage problem to be solved as input.

To solve an optimization problem, the optimization system 100 receives data input 101a-n. The data input 101a-n is generally a large dataset, i.e., a dataset that includes a large number of elements, that are is divided into sets of elements, e.g., $S\_1, S\_2, \ldots, S\_n$. In some cases, sets can be documents and elements can be n-grams contained in the documents. In other cases, sets can represent users and elements can be data, e.g., documents, videos, search results, content items, and so on, interacted with, e.g., viewed, selected, commented on, or edited, by the users. In yet other cases, sets can be vertices of a graph and elements can be their two- or three-hop neighborhoods.

Figures 2A, 2B:
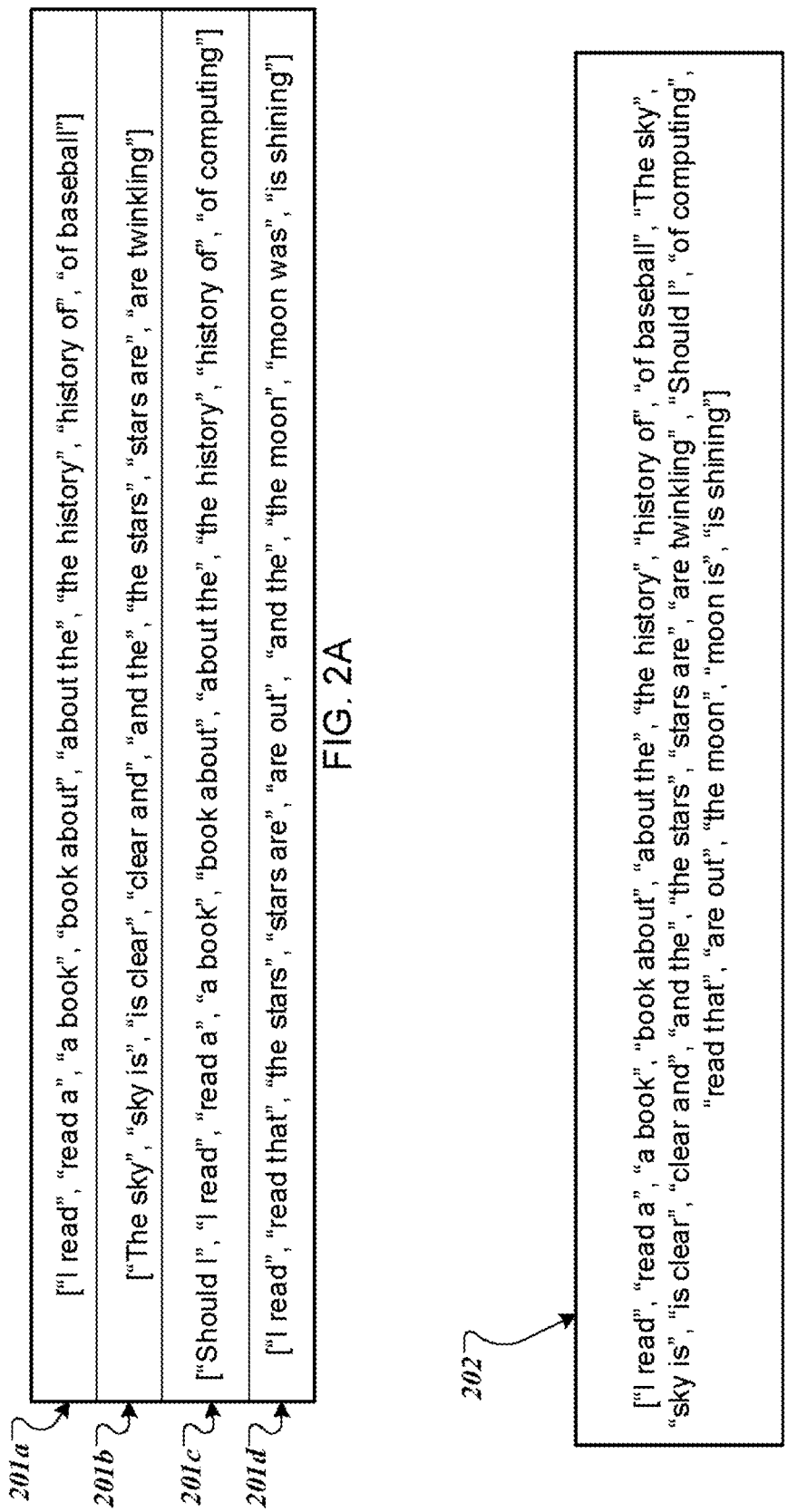
FIG. 2A is an example of sets of elements.
FIG. 2B is an example ground set from the sets of elements of FIG. 2A.

FIG. 2A illustrates an example of sets of elements that the optimization system 100 can receive. Each set includes one or more elements. In the example illustrated in FIG. 2A, the system receives documents as sets and bigrams as the elements that each set contains. Each set represents a single document. The elements of a particular set are the bigrams from the document that the set represents. For example, as illustrated, document 201a is considered one set. This document contains several elements in the form of bigrams. The elements, i.e., bigrams, of the set, i.e., document, are: "I read," "read a," "a book," "book about," "about the," "the history," "history of," and "of baseball."

Each received set, $S\_i$, is a subset of a ground set, I, with m elements. FIG. 2B illustrates the ground set of elements 202 based on the received sets of FIG. 2A. In this example, the ground set 202 includes all the unique elements, i.e., bigrams, across all the sets 201a-d, i.e., documents, in FIG. 2A.

Referring back to FIG. 1, the reduction engine 102 takes in a large dataset as sets of elements. As in the example illustrated in FIG. 2A, the large dataset can correspond to documents and the bigrams they contain.

The reduction engine 102 uses a subsampling engine 104 to sample elements to be removed from the ground set. In particular, the subsampling engine 104 removes any given element in the ground set with probability p, where p is a probability of sampling an element within the sets of elements. This probability is a number between 0 and 1.

In some implementations, a hash function arbitrarily maps elements of a dataset to real numbers in [0, 1] in order to determine a probability for each element that is independent of the content of the element. The optimization system 100 removes any element from the large dataset with a hash value that exceeds p. By removing elements from the sets that have a probability greater than p, the optimization system 100 generates a reduced ground set, I'.

In some implementations, the probability can be chosen arbitrarily. In other implementations, the probability can be fixed with a formula, i.e., a formula based on the number of elements in a set or on the total number of sets. The probability may also be found using statistical analysis of the input.

In still other implementations, the system scans the input and places an upper bound on the probability based on the number of elements of the sets or the total number of sets. If the upper bound is too large, the probability can be lowered to obtain a smaller reduced ground set. The system may also dynamically adapt the probability to the amount of available memory.

As disclosed above, in a given example, p may be a probability of sampling elements in the sets. For example, the defined probability may equal 0.5. Therefore, the probability that the optimization system 100 will remove any given element in the received set is 0.5.

FIG. 3A illustrates the hash values 302 corresponding to the ground set 202 of FIG. 2B. Elements 6, 11, and 12 of the ground set have hash values that exceed the probability of 0.5. Therefore, the optimization system will remove these elements. In the example from FIG. 2A, these elements correspond to the bigrams, "the history," "is clear", and "clear and." By removing these elements, the optimization system 100 creates a reduced ground set I'.

FIG. 3B illustrates the elements to be removed from the sets based on probability. As illustrated, "the history" will be removed from set 301a and set 301c. The bigrams "is clear" and "clear and" will be removed from set 301b.

After removing elements that have a hash value that exceeds p, the upper bound enforcement engine 106 of the reduction engine 102 enforces an upper bound on the degree of elements in the computationally-efficient representation. The degree of an element is the number of sets in which the element appears. The upper bound enforcement engine 106 determines whether any item in the reduced ground set I' appears in more than a D number of sets, where D is a predetermined maximum degree. This maximum degree is determined in terms of the number of subsets in the large dataset, the ground set of elements, and a chosen k for k-cover optimization.

Figure 3C:
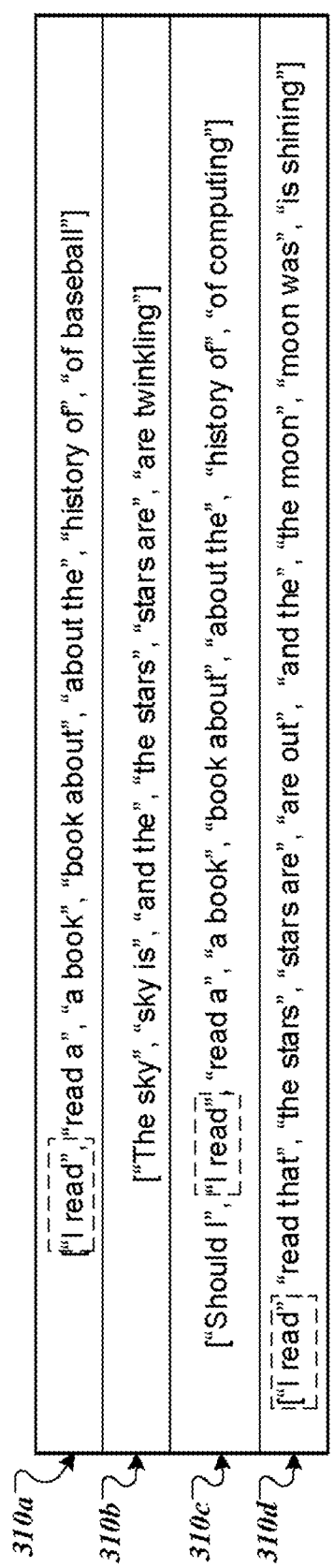
FIG. 3C is an example of sets of elements of FIG. 2A in which elements appear more than D times, where D is an upper bound degree and in this example D=2.

If any element appears in more than D sets, the optimization system 100 arbitrarily removes the element from some of the sets in order to maintain the upper bound of D on the frequency of the element. For example, the optimization system 100 may determine that the optimal degree of an element is 2 and any element appearing in more than 2 sets should be removed from subsequent sets. Referring to FIG. 3C, element, e.g., bigram, "I read" appears in more than 2 sets. Therefore, the optimization system 100 will arbitrarily remove this bigram from at least one set in order to comply with the specified degree of 2, assuming that the bigram was not already removed in the first stage of reduction when subsampling the elements.

Figure 3D:
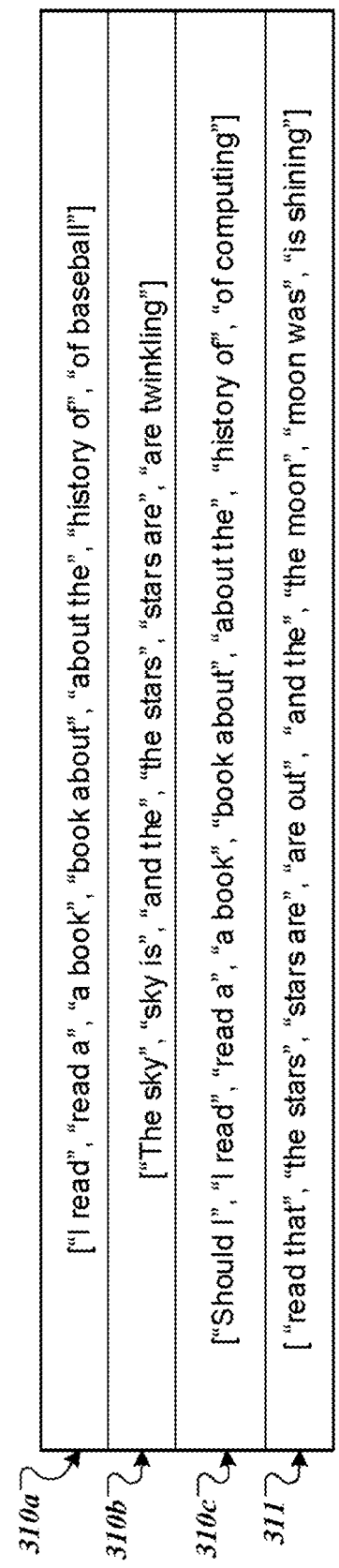
FIG. 3D illustrates the resulting set system over ground set I' that forms the computationally-efficient representation.

FIG. 3D illustrates the resulting set system T_1, T_2, ... T_n over ground set I' that forms the computationally-efficient reduction. As illustrated, element "I read" has been removed from set 311. The computationally-efficient representation optimizes space usage requiring only $\hat{O}(n)$ space, meaning quasilinear space. In other words, the input has a few bytes per each n set in the input, e.g., log(n)*log(1/e) bytes per set.

After the representation 103 is generated, the optimization engine 108 operates on the representation 103, i.e., instead of directly on the received data set 101a-n. In particular, optimization engine 108 can solve optimization problems e.g., using one of the techniques described below. The techniques are optimal algorithms in terms of running time, space usage, and approximation guarantee.

FIG. 4A illustrates an algorithm for constructing a computationally-efficient representation for RAM models. For large datasets using a RAM model, when approximating a maximum k-cover solution, the probability for subsampling depends on the value of the optimum solution of the problem. The value of the optimum solution may not be accessible while constructing a computationally-efficient representation. To resolve this issue, the optimization system 100 defines the computationally-efficient representation so that the representation always has a fixed number of edges, representing relationships between sets and elements. The optimization system has two intermediary representations, $H_p$ and $H_{p'}$. For a fixed probability, the system defines $H_p$ as described above, to be the representation of the large dataset after elements with hash values that exceed p have been discarded. $H_{p'}$ is a maximal subgraph of $H_p$ in which the degree of vertices is at most $$\frac{n\log\left(\frac{1}{\varepsilon}\right)}{\varepsilon k},$$

where n is the number of subsets in the large dataset, ε is a probability between 0 and 1, and k is a provided number of sets that should be used to cover the maximum number of elements.

To create the computationally-efficient representation, the optimization system 100 receives an input graph of the large dataset, a number k, a value c, and a value d". d" is an upper bound on the probability of failure.

The optimization system sets the value d to d" log $$\left(\frac{\log(m)}{\log(1-\varepsilon)}\right),$$

where m is the number of elements in the ground set. The system then executes a hash function that uniformly and independently maps the elements in the input graph to a number between 0 and 1. The computationally-efficient representation is initialized with the sets of the input graph and no edges. For example, using the example input of FIG. 2A, the computationally-efficient representation is initialized with the documents of the large dataset, but no bigrams. In order to fill the representation, the system iteratively chooses elements with the smallest hash value that are not in the representation. If the degree of the element in the input graph is less than $$\frac{n\log\left(\frac{1}{\varepsilon}\right)}{\varepsilon k},$$

the system adds the element and all of its set relationships, i.e., edges, to the computationally-efficient representation. If the degree is not less, the system adds the element and $$\frac{n\log\left(\frac{1}{\varepsilon}\right)}{\varepsilon k}$$

of its set relationships chosen arbitrarily. This process continues until the number of set relationships in the computationally-efficient representation equals a predefined amount, $$\frac{24n\hat{O}\log\left(\frac{1}{\varepsilon}\right)\log n}{(1-\varepsilon)\varepsilon^3}.$$

Once the system has generated the representation, the system can use the representation to solve coverage problems.

FIG. 4B illustrates an algorithm for constructing a computationally-efficient representation for streaming models. To create a computationally-efficient representation of a streaming data model, the optimization system receives an input graph of the large dataset, a number k, a value ε, and a value d". The optimization system sets the value d to d" log (log(m)/log(1−ε)), where m is the number of elements in the ground set. The system chooses $$\frac{24n\tilde{\partial}\log\left(\frac{1}{\varepsilon}\right)\log n}{(1-\varepsilon)\varepsilon^3} + \frac{n\log\left(\frac{1}{\varepsilon}\right)}{\varepsilon k}$$

elements from the ground set uniformly at random, where Π is a random permutation over these elements.

The system initializes the computationally-efficient representation with the sets of the input graph and no edges. As disclosed above, using the example input of FIG. 2A, the computationally-efficient representation is initialized with the documents of the large dataset, but no bigrams. In order to create the representation, the system looks at an edge, a set-element relationship. If the element of the edge is not sampled in Π the system discards the set-element relationship. If the degree of the element in the input graph is $$\frac{n\log\left(\frac{1}{\varepsilon}\right)}{\varepsilon k}$$

then the set-element relationship is also discarded. Otherwise, the set-element relationship is added to the computationally-efficient representation. After reviewing all edges and adding edges to the representation according to the above criteria, the system then determines if the number of edges in the computationally-efficient representation is more than $$\frac{24n\tilde{\partial}\log\left(\frac{1}{\varepsilon}\right)\log n}{(1-\varepsilon)\varepsilon^3} + \frac{n\log\left(\frac{1}{\varepsilon}\right)}{\varepsilon k}.$$

If so, the system chooses the last element in Π and removes the element from Π. The system then removes the element from the computationally-efficient representation. This process continues until there are at most $$\frac{24n\tilde{\partial}\log\left(\frac{1}{\varepsilon}\right)\log n}{(1-\varepsilon)\varepsilon^3} + \frac{n\log\left(\frac{1}{\varepsilon}\right)}{\varepsilon k}.$$

edges, representing set-element relationships in the computationally-efficient representation.

FIG. 4C illustrates an algorithm for constructing a computationally-efficient representation for distributed models. Data in a distributed model is distributed across multiple computational machines in a distributed system. Computational machines can be servers, processors, or other computing devices. To create a computationally-efficient representation of a distributed data model, the optimization system needs to aggregate the data on one machine. The optimization system first receives an input graph of the large dataset, a number k, a value c, and a value d". The system then executes a hash function that uniformly and independently maps the elements in the input graph to a number between 0 and 1. In a first round of execution, the system sends the edges, i.e., the set-element relationship, of each element to a distinct machine. The system then sets a variable ñ to $$\frac{24n\tilde{\partial}\log\left(\frac{1}{\varepsilon}\right)\log n}{(1-\varepsilon)\varepsilon^3}.$$

For each element, if the hash value of the element is less than or equal to 2ñ/m, the machine corresponding to the element sends the hash value and its degree to a first machine. If the hash value is greater than the defined value, the machine corresponding to the element does nothing. In second round of execution, the first machine iteratively selects elements with the smallest hash value until the sum of the degrees of the selected elements upper bounded by nlog (1ε) reaches ñ. Then the machine informs the machines corresponding to the selected elements. In a third round of execution, for each selected element, if the degree of the element is less than $$\frac{n\log\left(\frac{1}{\varepsilon}\right)}{\varepsilon k},$$

the machine corresponding to the element sends all of its edges, representing set-element relationships, to the first machine. Otherwise, the machine sends an arbitrary number of edges equal to $$\frac{n\log\left(\frac{1}{\varepsilon}\right)}{\varepsilon k},$$

to the first machine. In a final execution round, the first machine receives the computationally-efficient representation of the input large dataset and solves a coverage problem on it by applying a greedy algorithm.

FIG. 4D illustrates an algorithm for solving a k-cover problem using the computationally-efficient representation for streaming models. In order to solve a k-cover problem, the optimization system receives an input graph of the large dataset, a number k, and a value ε. The system sets the value, d", to 2+log n and $$\varepsilon' = \frac{1}{12}\varepsilon.$$

The system then constructs the computationally-efficient representation using the algorithm of FIG. 4B. The system then runs a greedy algorithm or any 1−1/e approximation algorithm on the computationally-efficient representation and provides the solution as output. The solution is a 1−(1/e)−ε approximation guarantee solution to the k-cover problem on the input graph with probability 1−(1/n). The system provides a solution that covers at least 63% of the optimum. In practice, the system may even provide the optimum solution 90% of the time.

FIG. 4E illustrates an algorithm used for solving set cover problems using the computationally-efficient representation for streaming models. In order to solve a set cover problem, the optimization system receives parameters k', ε', λ', and C' as well as a graph G promised to have a set cover of size k'. The system sets the value, d", to $\log_{1+\varepsilon}n[\log (C'n)+2]$ and $$\varepsilon = \frac{\varepsilon'}{13\log\frac{1}{\lambda}}.$$

The system then constructs the computationally-efficient representation using the parameters $$k'\log\frac{1}{\lambda'}\varepsilon,$$

and d". Once the computationally-efficient representation is acquired, the system runs a greedy algorithm on the representation to obtain a solution. If the solution covers at least $$1 - \lambda' - \varepsilon\log\frac{1}{\lambda}$$

of elements in the ground set, the system returns the solution. Otherwise, the system returns false.

Figures 4F, 4G:
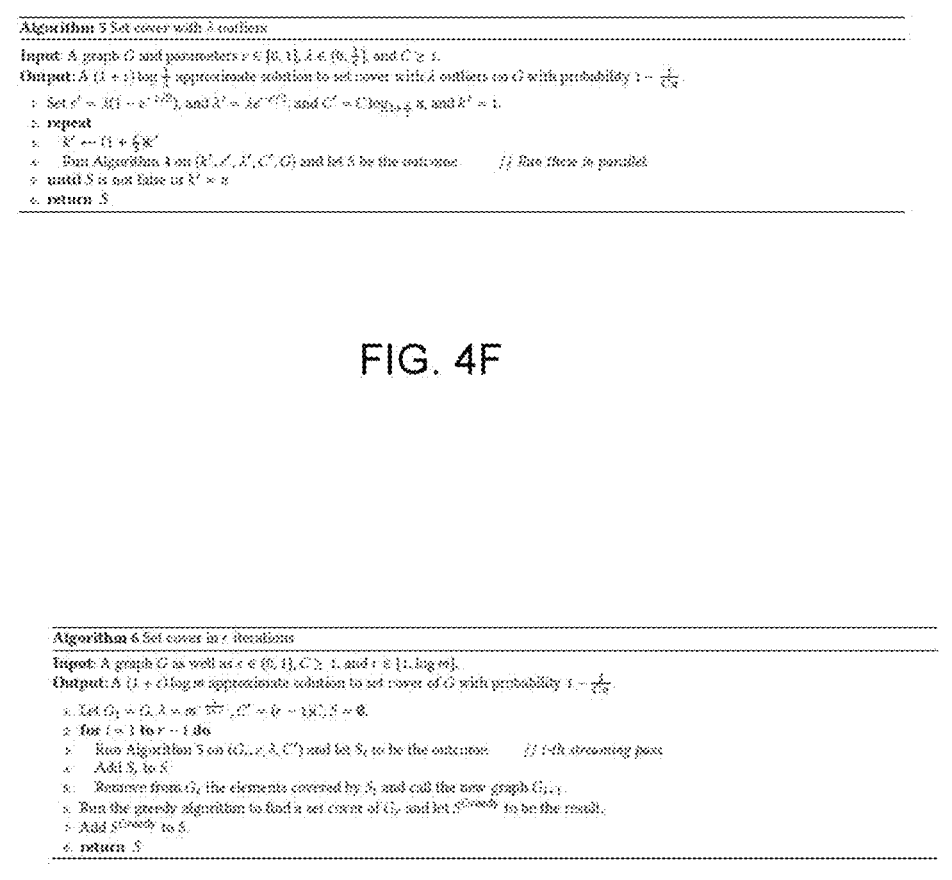

FIG. 4F illustrates an algorithm for solving set cover with $\lambda$ outliers using the computationally-efficient representation for streaming models. In order to solve this problem, the optimization system receives an input graph of the large dataset, and parameters $\varepsilon$, $\lambda$, and C. The system sets $\varepsilon'$ to $\lambda(1-e^{-\varepsilon/2})$ and $\lambda'$ to $\lambda e^{-\varepsilon/2}$ and C' to C $\log_{1+\varepsilon/3}$n, and k' to 1. The system assigns k' the value of $(1+\varepsilon/3)$k' and then runs the algorithm of FIG. 4E until the solution is not false or k'=n.

FIG. 4G illustrates an algorithm for solving set cover problems in r iterations using the computationally-efficient representation for streaming models. In order to solve this problem, the optimization system receives an input graph of the large dataset, and parameters $\varepsilon$, $\lambda$, and C, and r. The system sets $G_1$ to G, $\lambda$ to $m^{1\ 1/(2+r)}$, C' to (r−1)C, and S to 0. The system iterates from 1 to r−1. At each iteration, the system runs the algorithm of FIG. 4E using parameters $G_i$, $\varepsilon$, $\lambda$, and C', letting $S_i$ be the outcome at every iteration. Each iterative solution is added to the overall solution. The system then removes the elements from $G_i$ that are covered by the iterations solution. The new graph is then $G_{i+1}$. Once the iterations have completed, the system will run the greedy algorithm to find a set cover of $G_r$, and let $S^{Greedy}$ be the result. This result is added to the overall solution and then the solution is output. This algorithm has an approximation guarantee of $(1+\varepsilon)$ log m and uses almost linear space when r is logarithmic in m, e.g., r=log m.

Figure 5:
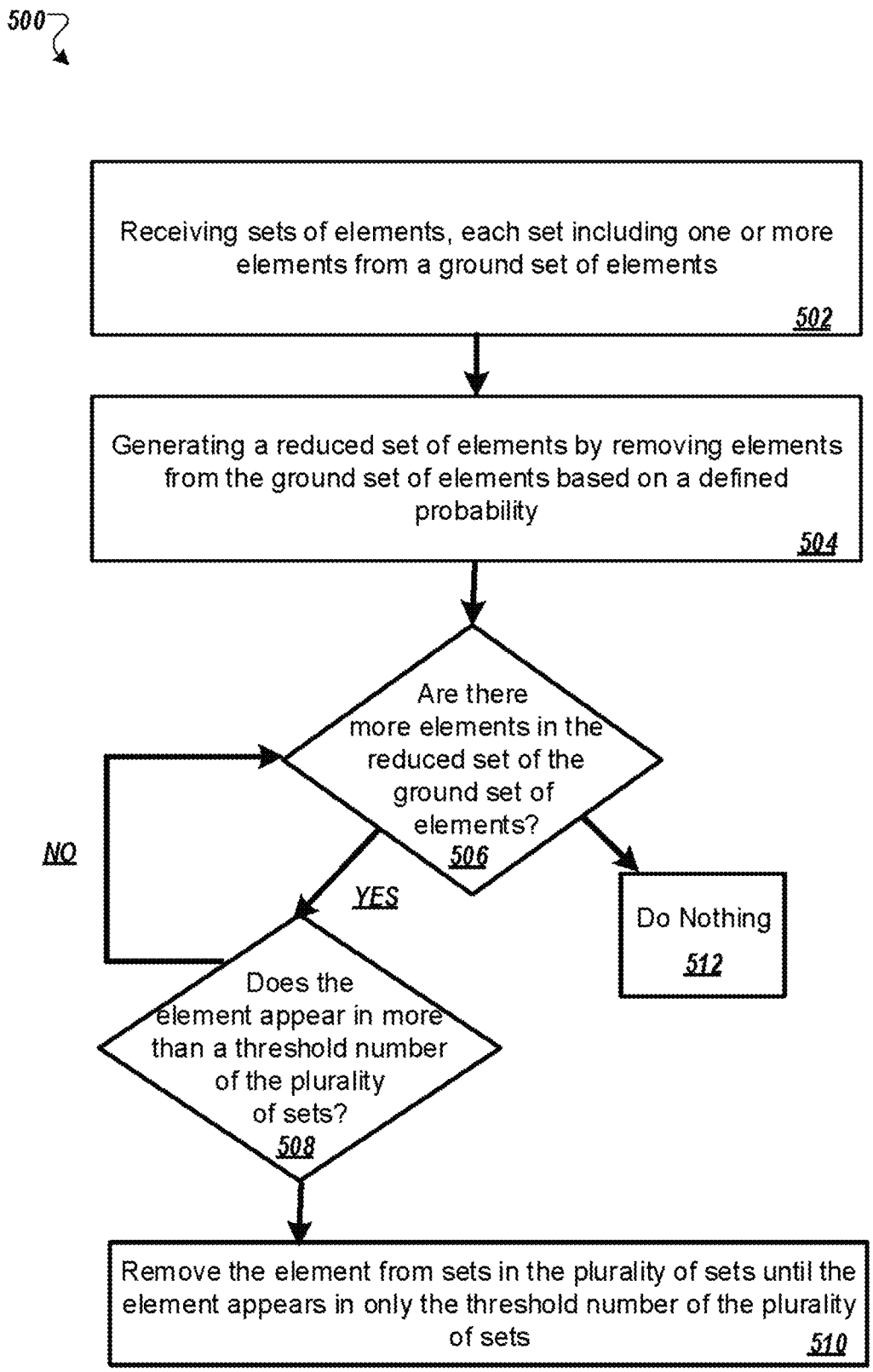
FIG. 5 is a flow diagram of an example process for generating a computationally-efficient representation of sets of elements.

FIG. 5 is a flowchart of an example process 500 for creating a computationally-efficient representation of a large dataset for solving coverage problems. For convenience, the process 500 will be described as being performed by a system of one or more computers, located in one or more locations, and programmed appropriately in accordance with this specification. For example, an optimization system, e.g., the optimization system 100 of FIG. 1, appropriately programmed, can perform the process 500.

The system receives a large dataset that is partitioned into sets. Each set includes one or more elements from a ground set of elements 502. The system generates a reduced set of elements for the sets of elements by removing elements from the ground set of elements based on a defined probability 504. Those elements are then removed from the sets of elements. The system examines the elements in the reduced set of ground elements. For each element, the system determines whether the element appears in more than a threshold number of the received sets of elements 508. As discussed above, the system sets an upper bound on the degree to which a given element should appear in the sets of elements. In the example given with respect to FIGS. 3C-3D, the upper bound was 2. All elements that appeared in more than 2 sets were removed from at least one set so that their respective upper bound matched the predetermined upper bound. A given element is removed from the sets of elements until the element appears in only the threshold number, i.e., the predetermined upper bound, of sets 510. The process produces sets, T_1, T_2, . . . T_n with a total size that is small enough to fit on memory of one machine, yet sufficient for solving a coverage problem.

As disclosed above, the optimization system can work on multiple types of large datasets including datasets handled by streaming, MapReduce, and RAM models. The optimization system can run algorithms using the computationally-efficient representation to solve various types of coverage problems including: dominating-set instances, bag of words instances, contribution graphs, planted set-cover instances, and feature-selection instances.

In the dominating-set instances problems, dominating-set instances are formed by considering vertices of a graph as sets and their two- or three-hop neighborhoods as elements they dominate. The dominating-set problem is motivated by sensor placement and influence maximization applications.

In the bag of words problems, sets are documents and elements are the bigrams they contain. The goal is to pick a few documents that cover many bigrams together. This instance highlights the application of coverage maximization in document summarization or finding representative entities in a corpus.

Contribution graphs model the interaction between users on a set of documents. The coverage problems can provide a small subset of users that collectively have contributed to a majority of documents.

Planted set cover instances are synthetically generated and known to be hard for greedy algorithms.

A feature-selection instance proposes a column subset selection problem on a matrix of articles and their features.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving a request to apply a coverage algorithm to a large input dataset comprising a plurality of sets of elements, each set including one or more elements from a ground set of elements;
   generating a computationally-efficient representation of the large dataset, comprising:
     generating a reduced set of elements that contains fewer elements than the ground set of elements by removing elements from the ground set of elements based on a defined probability; and
     generating the computationally-efficient representation by, for each element in the reduced set of elements:
       determining whether the element appears in more than a threshold number of the plurality of sets; and
       when the element appears in more than the threshold number of the plurality of sets, removing the element from sets in the plurality of sets until the element appears in only the threshold number of the plurality of sets;
   applying the coverage algorithm to the computationally-efficient representation of the large input dataset to identify a subset of the plurality of sets; and
   providing data identifying the subset of the plurality of sets in response to the received request.

2. The method of claim 1, wherein generating the reduced set of elements comprises:
   using a hashing function to determine a respective hash value for each element in the ground set of elements; and
   removing each element from the ground set of elements whose hash value exceeds the defined probability.

3. The method of claim 2, wherein generating the reduced set of elements comprises:
   assigning each element to a respective machine;
   for each element,
     using, by the machine to which the element has been assigned, the hashing function to determine a hash value of the element;
     if the hash value of the element is less than the defined probability, sending the hash value for the element and a degree of the element to a designated single machine, wherein the degree of the element is a number of sets to which the element belongs;
   receiving, by the single machine, the hash values and the degrees of the elements that have hash values less than the defined probability; and
   iteratively selecting elements for inclusion in the reduced set by increasing the hash value until a total degree of selected elements in the reduced set reaches a second predefined amount; and
   wherein generating the computationally-efficient representation comprises:
     for each element in the reduced set:
       determining, by the machine to which the element has been assigned, whether the degree of the element exceeds the threshold number;
       when the degree does not exceed the threshold number, sending data identifying the sets to which the element belongs to the single machine; and
       when the degree exceeds the threshold number, sending data identifying the threshold number of sets to which the element belongs to the single machine;
     receiving, by the single machine, the number of selected elements from the respective machines; and
     generating, by the single machine, the computationally-efficient representation of the plurality of sets from the received elements.

4. The method of claim 1, wherein the total size of the computationally-efficient representation of the plurality of sets of elements fits on memory of one machine.

5. The method of claim 1, wherein the coverage algorithm is a k-cover algorithm.

6. The method of claim 1, wherein the coverage algorithm is a set-cover algorithm.

7. The method of claim 1, wherein the coverage algorithm is set-cover with outliers algorithm.

8. The method of claim 1, wherein the coverage algorithm is a set-cover in iterations algorithm.

9. The method of claim 1, wherein applying the coverage algorithm to the computationally-efficient representation of the large input dataset comprises:
   applying the coverage algorithm to the computationally-efficient representation of the large input dataset in a large-scale computational framework.

10. The method of claim 9, wherein the large-scale computational framework is a MapReduce model.

11. The method of claim 9, wherein the large-scale computational framework is a RAM model.

12. The method of claim 9, wherein the large-scale computational framework is a streaming model.

13. The method of claim 1, wherein generating the computationally-efficient representation of the large input dataset comprises generating a representation that optimizes a running time of the coverage algorithm.

14. The method of claim 1, wherein generating the computationally-efficient representation of the large input dataset comprises generating a representation that optimizes space usage.

15. The method of claim 1, wherein generating the computationally-efficient representation of the large input dataset comprises generating a representation that optimizes an approximation guarantee of the coverage algorithm.

16. The method of claim 1, wherein generating the computationally-efficient representation of the large input dataset comprises generating a representation that optimizes the number of rounds or passes required to identify the subset.

17. The method of claim 1, wherein the probability is based on a total number of sets.

18. The method of claim 1, wherein the threshold is based on a total number of sets.

19. A system comprising:
one or more computers; and
one or more storage devices storing instructions that are operable, when executed on the one or more computers, to cause the one or more computers to:
generate a computationally-efficient representation of a large input dataset, comprising:
generate a reduced set of elements that contains fewer elements than the ground set of elements by removing elements from the ground set of elements based on a defined probability; and
generate the computationally-efficient representation by, for each element in the reduced set of elements:
determine whether the element appears in more than a threshold number of the plurality of sets; and
when the element appears in more than the threshold number of the plurality of sets, remove the element from sets in the plurality of sets until the element appears in only the threshold number of the plurality of sets;
apply the coverage algorithm to the computationally-efficient representation of the large input dataset to identify a subset of the plurality of sets; and
provide data identifying the subset of the plurality of sets in response to the received request.

20. One or more non-transitory computer-readable storage mediums comprising instructions stored thereon that are executable by a processing device and upon such execution cause the processing device to perform operations of:
generating a computationally-efficient representation of a large input dataset, comprising:
generating a reduced set of elements that contains fewer elements than the ground set of elements by removing elements from the ground set of elements based on a defined probability; and
generating the computationally-efficient representation by, for each element in the reduced set of elements:
determining whether the element appears in more than a threshold number of the plurality of sets; and
when the element appears in more than the threshold number of the plurality of sets, removing the element from sets in the plurality of sets until the element appears in only the threshold number of the plurality of sets;
applying the coverage algorithm to the computationally-efficient representation of the large input dataset to identify a subset of the plurality of sets; and
providing data identifying the subset of the plurality of sets in response to the received request.

* * * * *